United States Patent [19]

Bratschitsch

[11] 4,335,982
[45] Jun. 22, 1982

[54] APPARATUS FOR WETTING DIVIDED SOLID MATERIAL

[75] Inventor: John Bratschitsch, Hamilton, Canada

[73] Assignees: J. B. Systems, Ltd., Stoney Creek, Canada; Georgia Equipment Manufacturing Inc., Newnan, Ga.

[21] Appl. No.: 85,447

[22] Filed: Oct. 16, 1979

[51] Int. Cl.$^3$ .................. B65G 53/04; B65G 53/26
[52] U.S. Cl. ................................. 406/48; 406/195
[58] Field of Search ............. 406/48, 191, 194, 195, 406/151, 152; 366/173, 174, 177, 178, 183, 10, 11; 134/199; 239/502, 504

[56] References Cited

U.S. PATENT DOCUMENTS 3,081,784  3/1963  Hanna ........................... 406/48 X
3,337,273  8/1967  Farnworth ..................... 406/195

Primary Examiner—Joseph E. Valenza
Assistant Examiner—Gene A. Church
Attorney, Agent, or Firm—Hirons, Rogers & Scott

[57] ABSTRACT

Apparatus for wetting divided solid material so that it can be sucked into a storage tank by an entraining air stream without danger of damaging the expensive heavy duty air pump consists of a cylindrical body providing a wetting chamber which tapers outwardly from an inlet and inwardly to an outlet. A plurality of spray nozzles, each mounted in a recess, are provided uniformly spaced circumferentially and longitudinally around the chamber, so as to provide minimum spray pattern interference. A deflector means is provided immediately after the inlet to distribute the air flow over the chamber, consisting of a plurality of uniformly circumferentially distributed inwardly-extending finger-like members and an axial barrier on the flow axis. Another spray nozzle is provided spraying onto the deflector and also serving as a by-pass for the liquid supply pump, so that the nozzles operate with optimum spray patterns while the pump is at optimum flow capacity.

8 Claims, 3 Drawing Figures

APPARATUS FOR WETTING DIVIDED SOLID MATERIAL

FIELD OF THE INVENTION

The present invention is concerned with improvements in or relating to apparatus for wetting divided solid material so as to facilitate its movement by pumping.

REVIEW OF THE PRIOR ART

It is of course well known to wet dry finely divided solid material to make it generally easier to handle and capable of transport through a pipe. There is also a considerable service industry involving the removal and disposal of various liquid industrial and domestic wastes. One form of apparatus commonly employed for this service consists of a truck-mounted tank in combination with a heavy-duty, high-pressure air pump that can be driven by the truck motor. The pump evacuates air from the tank interior to suck in the waste liquid, and subsequently feeds pressurised air into the interior to discharge the waste at a disposal station. It happens frequently that the operator is also requested to remove dry divided solid material, e.g. sand or ash, but this they are unwilling to do unless the material has been very thoroughly completely wetted, because of the possibility of solid material entering the expensive air pump and destroying it. The pump is of course provided with an inlet filter, but a filter to keep out the fine particles involved would either be bulky and expensive, or would cause an unacceptable reduction in flow capacity of the pump.

DEFINITION OF THE INVENTION

It is therefore an object of the invention to provide an apparatus for wetting divided solid material that is readily incorporated in the suction hose of a liquid disposal unit and will ensure thorough wetting of the material passing through it.

In accordance with the present invention there is provided apparatus for wetting divided solid material entrained in an air stream, comprising:

a body having an inlet thereto and an outlet therefrom for the air stream, and providing in its interior a flow passage between the inlet and the outlet of greater cross-sectional area than the inlet;

deflector means mounted in the body adjacent the inlet to intercept the air stream and to distribute it over the greater cross-sectional area of the flow passage;

the said deflector means comprising a plurality of finger-like members extending radially inwards towards the axis of the flow passage; and a plurality of water spray nozzle means each disposed to spray water into the flow passage to wet the solid material in the stream, the nozzle means being spaced from one another circumferentially around the flow passage and also longitudinally along the passage.

The said deflector means may also include an axial member lying on the axis of the flow passage and toward which the finger-like members extend.

The said deflector means may be mounted on a removable end member of the apparatus providing the said passage inlet, and the removable end member also is provided with a water spray nozzle additional to the said plurality of nozzles spraying water onto the deflector means.

DESCRIPTION OF THE DRAWINGS

Apparatus which is a particular preferred embodiment of the invention will now be described, by way of example, with reference to the accompanying diagrammatic drawing, wherein.

DESCRIPTION OF THE PREFERRED EMBODIMENTS

Figure 1:
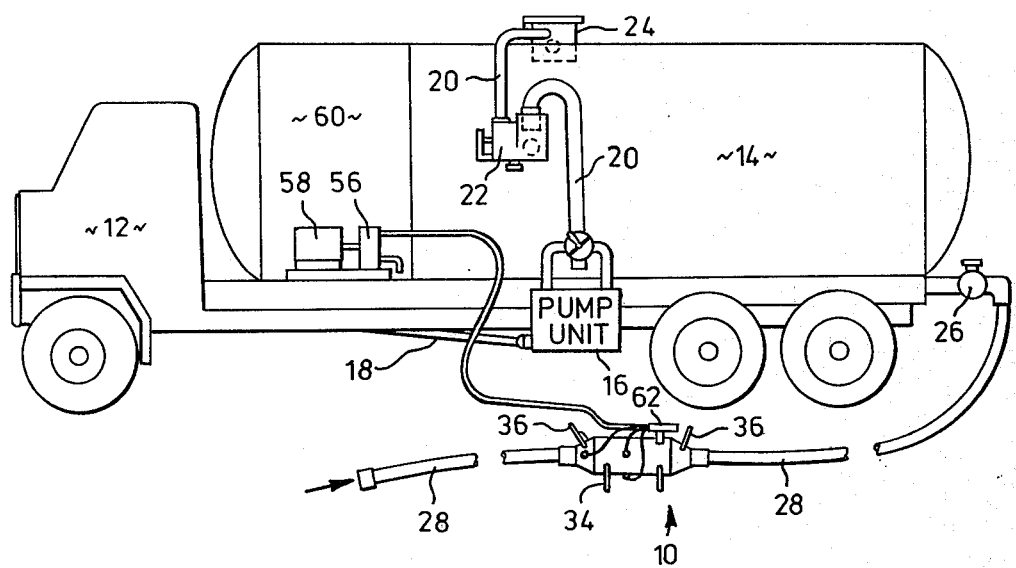
FIG. 1 is a side elevation of a tank truck and of the apparatus to show the manner in which they are used together.
Figure 3:
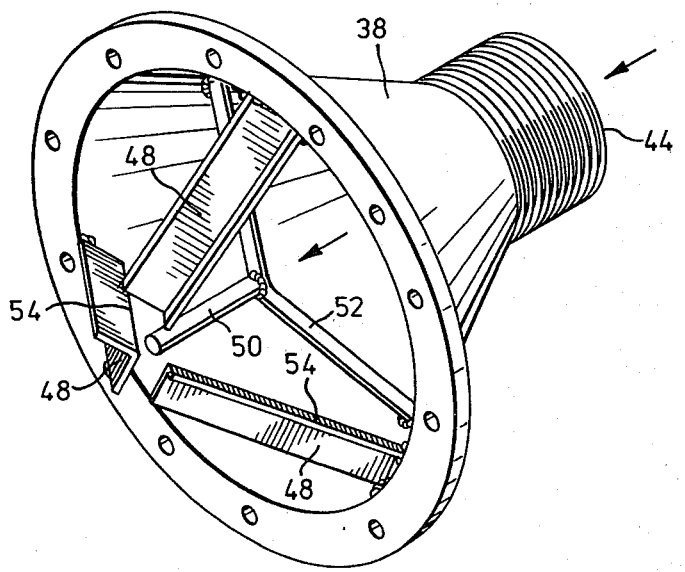
FIG. 3 is a perspective view of a removable end cap of the apparatus to show the deflector means mounted thereon.
Figure 2:
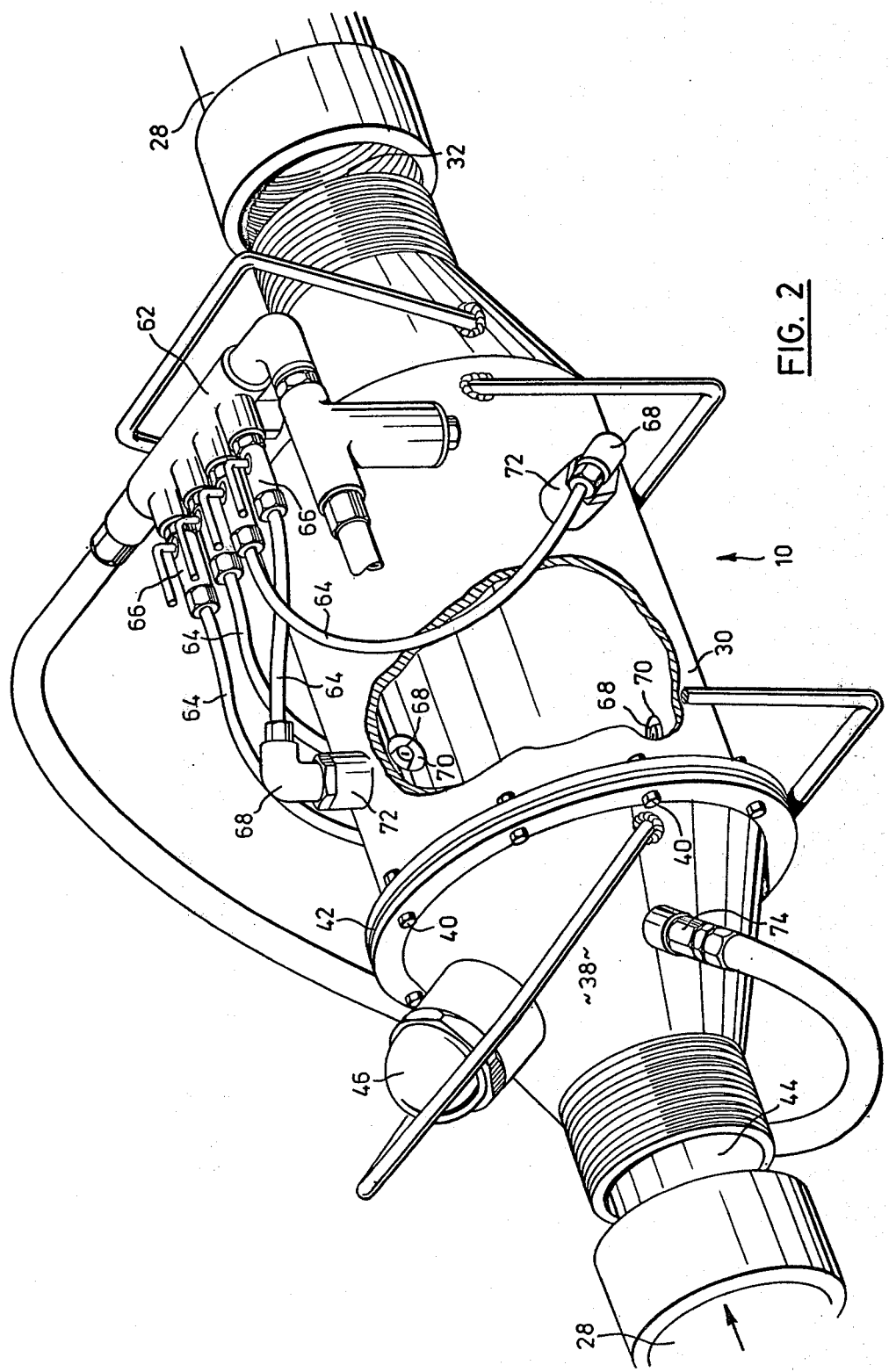
FIG. 2 is a perspective view of the apparatus with part of its sidewall broken away to show the interior.

The apparatus of the invention is indicated by the reference 10, and is illustrated as used in conjunction with a truck 12 having a tank 14 mounted thereon. The interior of the tank is evacuated or pressurised as required by means of a high-capacity, high pressure pump unit 16 driven from the truck engine via a power take-off 18, the pump being connected to the tank interior via hoses 20 and anti-back-flow valves 22 and 24, the valve 22 also including a sight glass. The importance of the valves 22 and 24 in ensuring that liquid from the tank cannot reach the pump and damage or destroy it is explained in for example my U.S. Pat. No. 4,057,364. It is even more essential that finely divided solid material does not reach the very expensive heavy duty pump unit. The waste material is fed into the tank and discharged therefrom via an inlet valve 26 to which is connected a long flexible hose 28 used to reach to the removal site.

The apparatus 10 of the invention is a small relatively portable unit that can be carried on the truck and inserted into the hose 28 when required; it can also be left permanently connected in the hose if that is satisfactory since the liquid wastes will simply pass through it. Preferably the apparatus is employed as near to the open end of the hose as possible so that the solids are wetted as soon as possible after entry into the hose.

The apparatus consists of a cylindrical body 30 of circular cross-section which tapers inwards at its rear end to provide an outlet 32 to which the respective portion of the hose 20 can be connected by a quick-release fastening. In use the apparatus stands on two spaced U-shaped legs 34 and is carried around by the operator by means of two U-shaped handles 36. An end cap 38 is fastened to the body 30 by bolts 40 (or by appropriate quick release fastenings) with a gasket 42 between them. The end cap also tapers inwards at its front end to provide an inlet 44 to which the respective portion of the hose can be fastened by a quick release fastening. The cap is also provided with a sight-glass 46 through which its interior can be viewed.

It will be seen that the cylindrical passage within the body 30 is of substantially greater cross sectional area than either the inlet or the outlet, and deflector means are provided immediately after the inlet to ensure that the air flow with its entrained solid material is distributed as uniformly as possible over the chamber interior, and so as to provide the maximum exposure to the water sprays. It has been found surprisingly difficult to provide a suitable deflector means and, for example, a centrally-disposed deflector cone does not provide satisfactory distribution. In this embodiment the deflector means are carried by the end cap 38, so as to be removable in case of bridging, and consist of three radially-inwardly-extending finger-like members 48, the members being uniformly circumferentially spaced around the interior of the end cap and being inclined rearwardly in the direction of flow of the air stream. The ends of the fingers do not quite reach the longitudinal central axis of the body, so as to leave a gap between them, and an axial rod-like barrier member 50 is disposed in this gap, lying along the axis, being held in position by a spider member 52. Each finger is in this embodiment of L-shape angle cross section with the arms of equal length, disposed with the convex apex 54 of the L facing into the stream. Such a barrier member has been found to be particularly effective.

The apparatus is provided wth a plurality of water spray means, five in this particular embodiment, which are supplied with water at the necessary high pressure from a pump 56, which may also be driven from the truck motor, but will more usually be driven by its own small motor 58. In this embodiment the truck 12 is illustrated as provided with a water supply tank 60, but it will be more usual to connect the pump via an ordinary garden-type hose to any immediately-available water supply tap; most sites at which the apparatus is used has such a tap within an accessible distance. The pressurised water is fed to a cross head 62 and thence via individual pipes 64 and valves 66 to the spray nozzles.

Four of the spray nozzles, indicated by the reference 68, are mounted on the body 30 to discharge into its interior, and it will be seen that they are distributed uniformly around the circumference of the passage at 90° to one another, and are also distributed uniformly along the length of the body, so that there is a minimum of interference between the spray patterns of the different nozzle means and the consequent increased possibility that the solid material is sprayed and wetted. Each spray nozzle is mounted in a side passage 70 provided by a tube 72, so as to be out of the air stream and therefore not subjected to the abrasive effect of the steam and its entrained solid material. A fifth nozzle spray means 74 is mounted on the removable end cap and discharges water directly at the deflector means to keep it constantly washed and ensure that solid material will not adhere to it and build up thereon. This fifth nozzle also serves as a by-pass flow means for the water supply system; thus the flows to the spray nozzles 68 are adjusted carefully to ensure that the desired spray patterns are obtained, and the remainder of the water is supplied to the nozzle 74; the pump can now operate at its designed constant optimum speed since the flow and spray pattern of this nozzle 74 is relatively non-critical. This arrangement again ensures that effective wetting is obtained.

In a typical installation intended to handle about 4 metric tons (4 tons) per hour the apparatus is of only 72 cm (28.5 inches) overall length. The front hose is of 7.5 cm (3 ins) diameter while the cylindrical flow chamber is of 22.5 cm (9 ins) internal diameter. The pump 56 will be of capacity 25-50 liters (6½-11 imperial gallons) per minute; a usual arrangement will be for the nozzles 68 to operate at 6.75-9 liters (1.5-2 galls) per minute with the balance taken by the nozzle 74. The tank 12 can be of capacity 2,250-27,000 liters (500-6,000 galls) depending on the user's requirements, while the pump will operate at from 4.25-34 cubic meters (150-1,200 cubic feet) per minute to provide up to about 71 cm (28 ins) of vacuum (water gauge). With an air pump of the higher capacities, i.e. above 28 cubic meters (1,000 cubic feet) per minute an inlet pipe of 5 cm (6 ins) diameter would be preferred, while the body 30 would have an internal diameter of about 30 cm (12 ins).

I claim:

1. Apparatus for wetting divided solid material entrained in an air stream, comprising:
   a body having an inlet thereto and an outlet therefrom for the air stream, and providing in its interior a flow passage between the inlet and the outlet of greater cross-sectional area than the inlet;
   deflector means mounted in the body adjacent the inlet to intercept the air stream and to distribute it over the greater cross-sectional area of the flow passage;
   the said deflector means comprising a plurality of finger-like members extending radially inwards towards the axis of the flow passage; and
   a plurality of water spray nozzle means each disposed to spray water into the flow passage to wet the solid material in the stream, the nozzle means being spaced from one another circumferentially around the flow passage and also longitudinally along the passage.

2. Apparatus as claimed in claim 1, wherein the deflector means also includes an axial member lying on the axis of the flow passage and toward which the finger-like members extend.

3. Apparatus as claimed in claim 1, wherein the said radially-extending finger-like members are inclined rearwardly in the direction of flow of air and solid material in the passage.

4. Apparatus as claimed in claim 3, wherein the deflector means also includes an axial member lying on the axis of the flow passage and toward which the finger-like members extend.

5. Apparatus as claimed in claim 1, wherein the said radially-extending finger-like members are of L cross section with the convex apex of the L facing into the direction of flow.

6. Apparatus as claimed in any one of claims 1, 2 or 3, wherein the said deflector means are mounted on a removable end member of the apparatus providing the said passage inlet, and the removable end member also is provided with a water spray nozzle additional to the said plurality of nozzles spraying water onto the deflector means.

7. Apparatus as claimed in claim 1, wherein each of the said spray nozzles is disposed in a side passage means discharging into the flow passage so as not to be impinged by the air stream and the solid material entrained therein.

8. Apparatus as claimed in claim 1, and including an additional spray means spraying water at the deflector means, means for feeding water to all the spray means and means for controlling the flow to the individual spray means with the additional spray means serving as a by-pass means for the first-mentioned spray means.

* * * * *